No. 636,609. Patented Nov. 7, 1899.
J. H. ZINN.
COMBINATION CULTIVATING MACHINE.
(Application filed Apr. 10, 1899.)
(No Model.) 2 Sheets—Sheet 1.
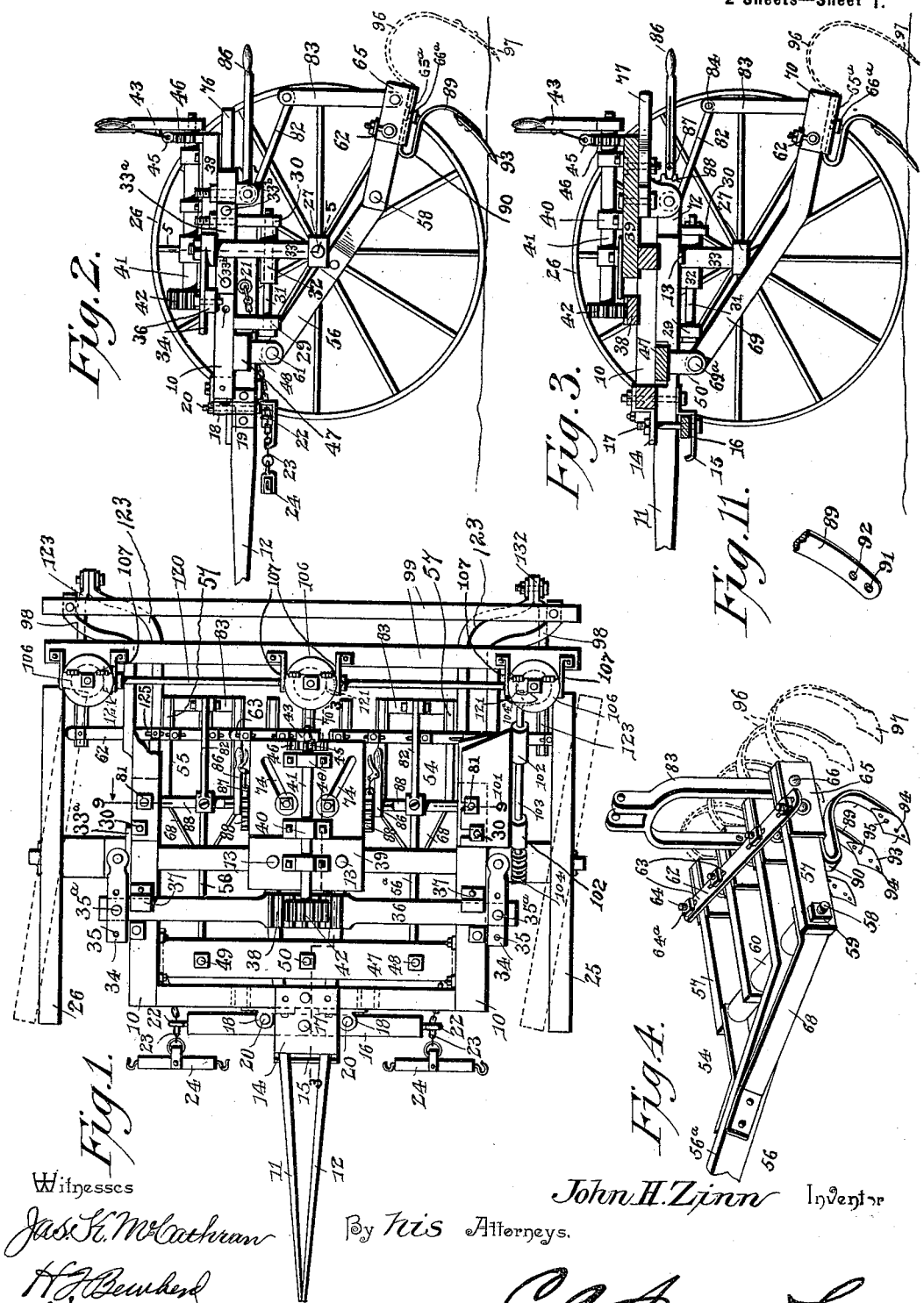
Witnesses
John H. Zinn Inventor
By his Attorneys.

No. 636,609. Patented Nov. 7, 1899.
J. H. ZINN.
COMBINATION CULTIVATING MACHINE.
(Application filed Apr. 10, 1899.)
(No Model.) 2 Sheets—Sheet 2.
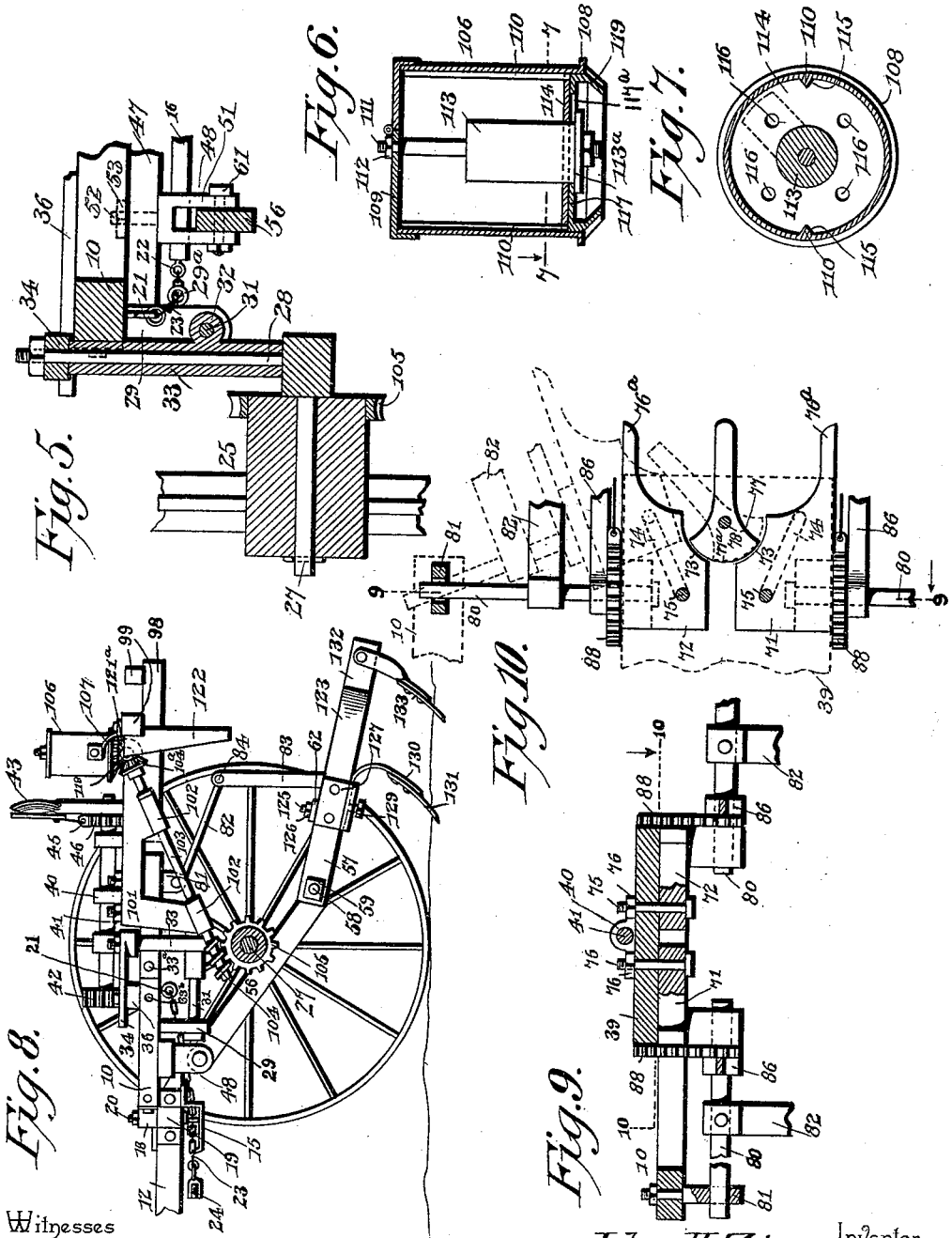
Witnesses
John H. Zinn, Inventor
By his Attorneys,

UNITED STATES PATENT OFFICE.

JOHN HARTZELL ZINN, OF GETTYSBURG, PENNSYLVANIA.

COMBINATION CULTIVATING-MACHINE.

SPECIFICATION forming part of Letters Patent No. 636,609, dated November 7, 1899.

Application filed April 10, 1899. Serial No. 712,481. (No model.)

*To all whom it may concern:*

Be it known that I, JOHN HARTZELL ZINN, a citizen of the United States, residing at Gettysburg, in the county of Adams and State of Pennsylvania, have invented a new and useful Combination Cultivating-Machine, of which the following is a specification.

This invention relates to a combination cultivating-machine, and has for its object to provide an improved machine of this character having means for cultivating and harrowing the soil and so constructed as to be also adapted for use in connection with a suitable planter attachment, whereby the different operations of planting and cultivating may be performed by one machine and the attachments thereof.

The machine-frame is equipped with carrying-wheels which are connected thereto by novel devices that dispense with an axle to extend across the machine, thus allowing increased range of adjustment to the suspended gangs of toothed beams. The wheel-supporting devices are adjustable lengthwise of the frame to effect the proper distribution of the weight and to enable the machine to be balanced, and with these wheel-supports are combined means by which the wheels may be turned simultaneously to positions obliquely to the line of draft, whereby the implement may be turned in a short space at the end of the furrow, and it is especially well adapted to cultivating a crop on a hillside. I also provide novel means for adjusting each gang of shovels or teeth in a vertical direction and in a horizontal direction, so that the gang of teeth may be raised clear of the ground to an inoperative position, or said gang may be adjusted laterally to clear a small obstruction in the path thereof without raising the teeth out of the soil.

The invention further contemplates certain novel features of construction, arrangement, and adaptation of parts which tend to promote the efficiency of the combination-machine and to increase its range of usefulness.

With this general nature of the machine in view the invention consists in the novel combination, construction, and arrangement of the several parts, which will be hereinafter fully described and claimed.

To enable others to understand the invention, I have illustrated the preferred embodiment thereof in the accompanying drawings, forming a part of this specification, and in which—

Figure 1 is a plan view of the combined cultivator and planter, the dotted lines representing the carrying-wheels adjusted to oblique positions. Fig. 2 is an elevation of the right-hand side of the machine with the carrying-wheel removed therefrom. Fig. 3 is a longitudinal sectional elevation on the plane indicated by the dotted line 3 3 of Fig. 1. Fig. 4 is a detail perspective view of one of the gangs of cultivator-shovels. Fig. 5 is a detail vertical section of one of the supporting devices for a carrying-wheel, the plane of the section being indicated by the dotted line 5 5 of Fig. 2. Fig. 6 is a detail vertical sectional view through one of the seed-hoppers. Fig. 7 is a cross-section through the hopper on the line 7 7 of Fig. 6. Fig. 8 is a vertical side elevation of the machine with the planter mechanism applied thereto and showing the shaft for driving the dropper-shaft geared to one of the carrying-wheels. Fig. 9 is a detail vertical section through the devices for adjusting the cultivator-gangs on the plane indicated by the dotted line 9 9 of Fig. 10. Fig. 10 is a detail plan view, partly in section, of the devices shown by Fig. 9, the platform being shown in dotted lines and on the plane indicated by the dotted line 10 10 of Fig. 9. Fig. 11 is a detail perspective of one of the cultivator-carrying stocks to show the perforated lower part thereof.

The same numerals of reference are used to indicate like and corresponding parts in each of the several figures of the drawings.

In carrying my invention into practice I employ a main carrying-frame 10, which consists of proper side and cross bars joined firmly together. The draft-tongue consists of two members 11 12, which are arranged in slightly divergent positions toward the rear end of the machine, and said tongue members extend beneath the front and rear cross-bars of the frame. The rear ends of the tongue members are joined individually to the rear cross-bar by vertical bolts 13, and to said tongue members are fitted the angular metallic plates 14 15, which are arranged above and below the members, respectively, and are secured firmly by vertical bolts to the front bar of said frame. The doubletree 16 is between the lower plate 15 and the tongue members, and it is supported pivotally by means of a vertical bolt 17, that is fastened to the metallic plates. On the vertical face of the front cross-rail are secured clips 18, and the tongue members are provided on their outer faces with similar clips 19, arranged in vertical alinement with the frame-clips 18 to permit the bolts 20 to pass through the alined clips and firmly brace the tongue members to the front part of the frame.

Draft-eyes 21 are fastened securely to the lower side of the side rails forming a part of the frame 10, and these draft-eyes are located well back of the doubletree and near the middle of the frame, at the sides thereof. Secured to the ends of the doubletree 16 are draft-eyes 22, through which are passed the draft-chains 23, that extend rearwardly and are fastened to the draft-eyes 22 on the frame. These draft-chains carry the whiffletrees 24 at their front ends, and provision is thus made for hitching the team to the implement, a suitable neck-yoke or other appliance being provided for coupling the front end of the tongue to the team. The draft of the team is transmitted by the chains to the eyes 22 on the sides of the frame, and the doubletree is connected by the draft-eyes 22 with the draft-chains, so as to equalize in a measure the draft on the machine.

The carrying-frame 10 is supported at a suitable elevation by a pair of carrying-wheels 25 26, disposed on opposite sides of said frame, and one of the novel features of my invention is the provision of means by which the frame may be balanced on these carrying-wheels, and the latter may be shifted to positions obliquely to the line of draft or in planes parallel to the draft-line. Each wheel is fitted loosely on a short stub-axle 27, which is integral with or made fast to the lower end of a vertical spindle 28, the spindle and stub-axle lying at right angles to each other. Secured firmly to each side bar of the main frame is a pair of vertical eyebolts 29 30, the threaded shanks of which are passed through openings in the frame-bar and receive nuts for firmly holding said bolts in spaced positions on the lower side of the frame. The pair of eyebolts support a horizontal bar or rod 31 in a fixed position below and parallel to the frame-bar, and this horizontal bar serves as the support for a wheel-hanger. The wheel-hanger consists of a horizontal sleeve 32 and a vertical tubular bearing 33, which are disposed at right angles to each other and are made or cast in a single piece of metal. The horizontal sleeve of the wheel-hanger is fitted loosely on the horizontal rod or bar 31 in a manner to permit the hanger to be adjusted back and forth in a plane parallel to the longitudinal axis of the machine-frame, and in such adjustment of the sleeve 32 the vertical bearing 33 is moved with the sleeve. The bearing 33 serves as the support for the vertical spindle 28, and said spindle is adapted to turn on a vertical axis within the bearing 33 in order to adjust the stub-axle 27 and the wheel mounted thereon in a horizontal plane, to the end that the wheel may be shifted with relation to the draft-line. The wheel-hanger is, furthermore, provided with a clamping-plate 33$^a$, which is integral with the sleeve-bearing 33, and this plate is adapted to be applied against the vertical face of the side bar of the machine-frame in a position to receive transverse bolts 33$^b$, whereby the sleeve-bearing may be secured firmly to the machine-frame. The face-plate of the wheel-hanger is secured adjustably to the machine-frame by providing openings or slots therein to receive the fastening-bolts, and thus the hanger is supported firmly on the frame at two points—that is to say, by the sleeve 32 on the rod 31 and the face-plate secured to the side bar.

The vertical spindles of the carrying-wheels are extended upwardly through the sleeve-bearings 33 of the wheel-hangers, and to these extended ends of said spindles are firmly attached the links 34, arranged to extend in a forward direction from the spindles. The links are provided with transverse apertures 35, and said apertured parts of the links are adapted to overlap a rack-slide 36, the links being adjustably and pivotally connected to the rack-slide by means of pivot-bolts 35$^a$, whereby the vertical spindles may be connected adjustably to the rack-slide to compensate for the horizontal back-and-forth adjustment of the wheel-hanger. The rack-slide 36 is arranged in a horizontal position transversely across the machine-frame, and it is fitted slidably in suitable guides 37 on such frame. At or near its middle the rack-slide is formed with a series of gear-teeth, which constitute the rack-surface of the slide. The horizontal plate or platform 39 is secured firmly on the main carrying-frame, preferably in rear of the rack-slide, and on this platform or plate are firmly secured the shaft-bearings 40, that accommodate the horizontal adjusting-shaft 41, said shaft being mounted loosely in the bearings to turn freely in either direction therein. The front end of the adjusting-shaft 41 has a gear-pinion 42 keyed thereto and arranged in a position to mesh with the teeth 38 of the rack-slide, and a lever 43 is also made fast with this horizontal adjusting-shaft to furnish a convenient means for rocking the same in its bearings. This lever is equipped with a latch 45, which is controlled by a spring-rod and hand-piece on the lever, and said latch is in a position to engage with the notched segment 46, which is fastened on the frame or the platform 39 thereon.

By releasing the latch 45 and turning the lever in one direction the shaft and its pinion will move the rack-slide in a direction to shift the links 34 and turn the vertical spindles 28 in their sleeve-bearings of the wheel-hangers, and thereby change the position of the carrying-wheels with relation to the line of draft. Assuming that the carrier-wheels are normally in planes parallel to the line of draft, a movement of the lever in one direction will effect a corresponding change in the positions of the wheels with relation to the line of draft to dispose the carrying-wheels obliquely; but a reverse movement of the lever shifts the carrying-wheels in the opposite direction. This means for controlling the position of the carrying-wheels is especially advantageous when the machine is used as a cultivator on a hillside, because the wheels may be arranged in a position to prevent the machine from sliding down the hill, and thereby adapt the machine to be drawn through the rows parallel with the lines thereof. The described mechanism is furthermore advantageous in turning the machine and team at the end of the furrow, particularly when the implement is used as a planter, and such wheel-controlling appliance provides for the turning of the machine and team within a very narrow compass at the end or side of the field. At the same time the described construction of the wheel-hangers permits the wheels to be shifted back and forth in lines parallel to the longitudinal axis of the machine and with reference to the transverse middle thereof. This adjustment of the wheel-hangers on the horizontal rods or bars 31 enables the machine to be balanced on the wheels, and in their adjusted positions the wheel-hangers are attached firmly and immovably to the frame.

In my improved implement the corn-planter appliance is designed to be secured removably to the rear part of the machine-frame, and with the wheel-hangers moved to the forward limits of the horizontal rods 31 the weight of the machine when equipped with the corn-planter attachment would overbalance the rear end of the machine, so as to throw the tongue in an upward direction. To overcome this objection, when the corn-planter appliance is in use the wheel-hangers may be adjusted rearwardly on the horizontal rods 31, and the machine may be thus balanced to maintain substantially a horizontal position. On the removal of the corn-planter appliance and with the wheel-hangers and wheels at or near the rear ends of the carrying-bars the weight is thrown too far forward of the center, and to overcome this difference in the distribution of the weight the wheel-hangers may be adjusted more or less toward the front ends of the horizontal rods 31.

The frames for the gang of teeth are connected adjustably with a lower supporting-rail 47, which is disposed in a horizontal position across the machine-frame at a line immediately in rear of the front cross-rail, and on this rail 47 are secured the pivotal brackets 48 49 50, which have swivel connections with the rail to permit them to change their positions when the gang-frames are shifted laterally. Each swivel-bracket is provided with a slotted and perforated head 51 and a vertical pintle 52, the latter being passed loosely through an opening in the frame and held in place by a nut 53, which is screwed to the upper end of the bracket. (See Fig. 5.) The series of brackets are spaced at proper distances throughout the length of the rail 47, and each bracket is supported loosely on said rail to turn on a vertical axis.

54 55 designate the frames for the gangs of cultivator-teeth, and said frames have elongated bars, which are pivotally connected to the swivel-brackets 48 49, as will presently appear. Each frame 54 or 55 consists of a central angular bar 56 and a series of three or more side bars 57, said side bars being disposed in the same plane with a certain length of the angular bar 56. The front ends of the side bars are joined together and to the angular bar 56 by a cross-rod 58, having a nut 59 at one end, and said series of bars are spaced in proper relation by means of a series of thimbles 60, which are threaded on the rod 58 and are interposed between the bars 56 57. It is intended that thimbles 60 of variable lengths shall be employed in order to space the bars at different distances apart, and near their rear ends said series of bars are fastened to a common cross-bar 62. The angular bar 56 of the frame of each gang of teeth has its rear end disposed in the same plane with the bars 57, and said bar 56 is formed with an inclined length 56ᵃ, the forward extremity of which is fitted in the slot of one of the swivel-brackets 48 or 49. A pivotal bolt 61 passes through the perforation in the head 51 of said bracket and the forward extremity of the bar 56. The cross-bar 62 is arranged to span the spaces between the series of bars 56 57, and said cross-bar has a series of slots 63, (see Figs. 1 and 4,) which receive the bolts 64, that are fastened on the bars of the gang-frame, said bolts having the nuts 64ᵃ for adjustably and firmly clamping the bars to the adjusting cross-bar 62. The bars 56 57 of the frame for each gang of cultivator-teeth are provided with elongated clips 65. These clips are of sheet or cast metal, substantially U-shaped in cross-section, and they are applied to the lower sides of the bars forming the gang-frame. Each elongated clip is fastened in place by two or more bolts 66, that pass through the bars and the sides of the clip, and this clip is adapted to carry the spring-teeth, which sustain the cultivator shovels or points, or they may receive the harrow-teeth when the machine is to be used for harrowing the ground. Each clip 65 is furthermore provided with a vertical aperture 65ᵃ, near its middle, and in this aperture is fitted a binding-screw 66ᵃ, (see Figs. 2 and 3,) which is adapted to clamp the harrow-teeth or the cultivator-teeth firmly in place within the clip. The side bars of the gang-frame are braced by stays 68, which are fastened to said side bars and to angular bars 56.

In using the implement for harrowing purposes I employ a central angular bar 69, which has its forward extremity pivoted at 69ᵃ to the swiveled bracket 50, and this central bar is provided at its rear end with a clip 70, adapted to receive the cultivator-teeth or the harrow-teeth. The central bar 69 conforms to the bar 56 of the frame 55, and said bar 69 is connected with the cross-bar 62 of said gang-frame 55 for the purpose of making the bar 69 adjustable with said frame 55. (See Fig. 1.) The gang-frames, with the teeth thereon, are designed to be adjustable in vertical planes on the pivotal bolts 61, and as the brackets 48 49 are swiveled on vertical axes these gang-frames may be adjusted or swung in horizontal planes.

71 72 indicate separate carriers which are fitted into close relation to the lower faces of the platform 39 on the main frame 10, and each of these carriers is provided with a curved eccentric or cam face 73. The platform 39 is provided with slots 74, which diverge in opposite directions from each other, and said carriers are provided with bolts 75, which pass through the slots 74 in the platform and receive the nuts 76, by which the carriers are adapted to be held firmly in place on the platform. In the normal position of the carriers 71 72 the bolts are at the inner contiguous ends of the oblique slots 74, and the cam-faces 73 of said carriers are so related to a locking-block 77 that the latter is adapted to engage with said faces on both of the carriers, whereby the locking-block is adapted to assist the bolts 75 in holding the carriers firmly in a position beneath the platform. The locking-block 77 is provided with an enlarged cam-shaped head 77ᵃ, and it is pivoted or fulcrumed at 78 at a point equidistant from the oblique slots 74. When the locking-block is in a position in line with the longitudinal axis of the machine-frame, its cam-shaped head 77ᵃ is arranged to span the space between the two carriers 71 72, and thus the locking-block is adapted to engage jointly with said carriers; but said locking-block may be shifted on its fulcrum to free its head from engagement with one of the carriers and move the head into engagement with the other carrier, thus releasing either of said carriers and confining the other carrier firmly in place. Each carrier is provided with a handle 76ᵃ, that extends rearwardly beyond the platform and is disposed within convenient reach of the operator or driver for the easy manipulation or adjustment or the carrier. Each carrier supports one end of a rock-shaft 80, one of which is provided for each gang of teeth. The rock-shaft has one end thereof mounted in its proper carrier to turn therein, while the other end of said shaft is fitted in a swivel-eyebolt 81, which is attached to one of the side bars of the frame 10 in a manner to turn on a vertical axis, and thus accommodate the bearing for the outer end of the rock-shaft to changes in the position of said shaft due to the lateral shifting of the carrier 71 or 72. Firmly secured to each rock-shaft, at a point between the carrier and eyebolt, which form the bearings therefor, is a link 82, that extends rearwardly from said shaft, and this link has its rear end pivoted at 84 to the upper end of a hanger 83. The lower end of this hanger is pivoted or jointed to two of the bars of the gang-frame 54 or 55, and this hanger is thus adapted to serve, in connection with the link, for suspending the gang-frame from the rock-shaft and the carrier and eyebolt which are attached to the machine-frame 10. For the convenient adjustment of the shaft I provide a hand-lever 86, which is secured firmly to said shaft, and this hand-lever is equipped with a latch 87, controlled by a spring-rod and hand-grip and adapted to engage with a segment 88, which is fast or integral with the carrier.

From the foregoing description it will be noted that the carrier and rock-shaft may be shifted laterally with respect to the line of draft and on the vertical axis afforded by the swivel-bracket 48 or 49, to which the gang-frame is connected, it being of course understood that the bolt 75 of said carrier is released from the platform and that the locking-block 77 is adjusted to be free from engagement with the cam-face 73 of said carrier. The gang-frame may thus be conveniently adjusted in a horizontal direction to enable the teeth thereon to clear an obstruction in the path, and the two gang-frames 54 55 may be shifted in opposite directions. By moving the lever 86 after its latch shall have been released from the segment on the carrier the shaft may be rocked or turned in its bearings provided by the carrier and the eyebolt 81, and the gang-frame may thus be raised or lowered, as desired, by the operator, said frame being suspended by the hanger and the link and held in proper position by the engagement of the lever with the segment. The vertical adjustment of the gang-frame through the medium of the lever may be effected at any point in the position of the carrier with reference to the platform.

The clips 65 (see Figs. 2 and 4) on the bars which constitute the gang-frame are adapted to carry the spring cultivator-stocks 89. Each stock 89 is bent from a single bar of metal into the curved form, substantially as shown by the drawings, and each stock is provided with a shank 90, which is adapted to be inserted into the space between the clip and the gang-frame bar, said stock being held in place by the screw 66ᵃ of the clip 65. (See Figs. 2 and 3.) At its lower end the spring-stock is provided with two transverse apertures 91 92, and against one face of this stock may be applied the shovel or point 93, which is curved to conform to the spring-stock. The shovel or point has a series of transverse apertures 94, and said shovel may be adjusted for two of its apertures to aline with the holes 91 92 in the stock, in order that fastening-bolts 95 may be passed through the shovel and stock to firmly secure the parts together. The shovel may be raised or lowered on the stock in order to change the angle of presentation of said shovel to the ground, and this part of my invention contemplates the employment of shovels of different size, which may be used for the performance of different kinds of work.

The clips 65 on the bars of the gang-frame are also adapted to support a series of harrow-teeth 96, each of which is pointed at its lower end, as indicated at 97. When the machine is to be used for harrowing or pulverizing the ground, the spring-stocks, with the cultivator-teeth, are removed from the front ends of the clips, and in lieu of said spring-stocks I employ a plurality of curved harrow-teeth 96, which are fitted in the rear ends of the clip 65 and are designed to be fastened in place by the set-screws 66$^a$. The harrow-teeth extend rearwardly from the bars of the gang-frames and the central bar 69, and said harrow-teeth are removable at will from the frames.

I will now proceed to describe the appliance adapted to be used in connection with the machine for the purpose of planting seed, and in this connection it is proper to state that this seed-dropping appliance is used with certain of the indispensable elements of the machine heretofore described and that its dropper mechanism is driven positively from one of the carrying-wheels.

The planter-frame consists of the curved side bars 98 and the cross-bar 99, which are firmly joined together to produce a rigid structure adapted to be manipulated in its entirety for application to or removal from the frame 10. The side bars 98 are curved or deflected laterally with respect to each other, and each bar is made preferably in a single piece of metal, although other materials may be used. Said side bars are provided at their front ends with vertical apertures, and the bars are adapted to rest upon the side rails of the frame 10 in a position to receive the extended ends of the bolts 30 81, the nuts of which are adjusted to bind upon the side bars, and thereby clamp the planter-frame (see Fig. 1) securely in place on the main frame. The side bar at one end of the planter-frame is provided with a bracket-plate 101, arranged to overlap said bar and to be secured firmly in place thereon. This bracket-plate is constructed of metal to form the inclined alined bearings 102, which accommodate the driving-shaft 103 for the dropper mechanism, and this driving-shaft is provided at its lower forward end with a gear 104, arranged to mesh with a gear 105 on the hub of one of the carrying-wheels, as 25, whereby the planter-frame may be mounted on the main frame for the driving-shaft to be operatively connected with a wheel of said main frame. The cross-bars of the planter-frame carry a series of hoppers 106, preferably three in number, and adapted to deliver the grain in regulated quantities at three several points in the width of the machine. Each hopper is preferably embodied in the form of a vertical cylindrical drum provided with straps 107, that are secured firmly to the planter-frame. Each hopper is provided at its lower end with an offstanding annular flange 108, and the upper end of said hopper is closed by a cover 109, constructed, preferably, in two sections, one of said sections being hinged to permit opening movement of the cover without disturbing the spindle or shaft 111. Each hopper is furthermore provided with the vertical ribs 110, disposed at diametrically opposite sides of the hopper, and with these ribs is adapted to engage a loose disk or bottom 114, the latter being held against rotation within the hopper by engagement with said ribs. The spindle 111 extends centrally through the cylindrical hopper and passes through an opening in the cover 109 at one side of the hinges which join the two sections of the cover together, and the upper end of this spindle is provided with a nut 112, adapted to bind on the cover and suspend or fasten the spindle firmly in place within the hopper. The lower end of said spindle is enlarged to form a foot 113, which is provided with a flange 113$^a$. The said bottom 114 is provided in its edges with notches 115 to receive the ribs 110 of the hopper, and said loose bottom or disk is furthermore provided with seed-openings 116.

A rotary disk 117 is flanged to fit snugly to the flanged lower end 108 of the cylindrical hopper, and said rotary disk has a single transverse slot or opening 117$^a$ arranged in a position to coincide with the grain-openings 116 of the loose bottom 114, thus providing for the regular discharge of the seed from the hopper when disk 117 is rotated. Said disk is fitted revolubly to the lower end of the hopper in a position between its flanged end and the planter-frame, and the disk is provided with bevel gear-teeth 119, which mesh with one of the bevel-gears 121 on a horizontal dropping-shaft 120. The flanged foot of the spindle 111 passes centrally though the loose bottom 114 and the rotary dropping-disk 117, and the flange on the lower end of the spindle-foot confines the dropping-disk 117 against lateral displacement or play with relation to the loose bottom 114. The dropper-shaft 120 extends lengthwise of the planter-frame and across the machine-frame, and said shaft is journaled in proper bearings on the planter-frame, so as to be maintained in operative relation at all times to the hoppers and the dropper-disks, whereby the entire dropping mechanism is mounted on the planter-frame for removal therewith from the machine-frame 10. The dropping-shaft 120 is provided at one end with a bevel-gear 121$^a$, which meshes with a similar gear 104$^a$ on the upper rear end of the driving-shaft 103 of the planter mechanism. This planter-frame also carries the series of depending spouts 122, which are fastened to the frame in positions to receive the grain from the hoppers.

The devices for opening the furrows in which the grain from the planter mechanism is deposited into said furrows are carried by offset bows or supplemental shovel-carrying frames 123, which are fastened to the outer side bars 57 of the cultivator-gangs and to extensions of the bars 62, as shown in Fig. 1. The said bows extend rearwardly with relation to the carrying-wheels 25 26, so as to support the furrow-opening shovels and the coverers in positions out of the path of the carrying-wheels 25 26, whereby the latter may be adjusted in the manner heretofore described without striking the bows or the devices supported thereon. Each bow 123 has its inner arm perforated to receive the outer end of the cross-rod 58 on the cultivator-gang, so that the nut 59 of said cross-rod may be employed to assist in holding the bow in place. The inner and outer arms of each bow are fitted with bolts 125, which are adapted to pass through the slots 63 in the extensions of the cross-bar 62, and these bolts 125, each of which receives a nut 126, (see Fig. 8,) are adapted to bind on the cross-bar 62, whereby the bow may be clamped firmly in place on the cultivator-gang. The outer arm of the bow 123 is provided with a clip 127, having the binding-screw 129. The shovel-carrying arm 130 has its upper end fitted in the space between the clip and the bow, and said arm is clamped firmly in place by the screw 129. The furrow-opening shovel 131 is fastened to the lower end of the arm 130 to be supported by the arm and the bow in a position in advance of the spout 122 from the planter mechanism. Said bow 123 is furthermore provided with a rearwardly-extending arm 132, and on this arm are secured the covering-shovels 133, which are disposed in rear of the spout 122 and are arranged to deflect or throw the soil inwardly upon the grain deposited in the furrow by the operation of the planter mechanism.

With the planter mechanism applied to the machine-frame and operatively connected with its working elements in the manner previously described, the shaft 103 is driven positively by the gear on the hub of the wheel 25, and the motion of this shaft is communicated to the dropper-shaft 120, which in turn rotates the dropper-disk 117 in the series of hoppers. The grain or seed passes through the openings in the loose bottoms 114 of the hoppers, and in the rotation of the dropper-disks 117 the orifices therein are presented in line with the openings in said disks 114, thus permitting the grain to pass in regulated quantities to the spouts 122, that deliver the grain into the furrows opened by the shovels 131. The shovels 133 cover the grain, and the latter is thus planted and covered automatically in the operation of the improved machine.

In the use of the machine as a corn-planter the gang of cultivator-shovels and the series of harrow-teeth should be removed from the frames, and the shovel on the central beam 69 is disposed in line with the middle hopper on the planter-frame.

The eyebolt 29, which serves to support the front end of the horizontal rod or bar 31, is formed with an integral guide-eye 29$^a$, which extends inwardly beneath the main frame, and this guide-eye is situated in a plane below one of the draft-eyes 22 and in advance of the latter. This arrangement of the guide-eye 29$^a$ enables the draft-chain 23 to be passed through the guide-eye before it is attached to the draft-eye 22, and thus the course of the draft-chain from the doubletree to the eye 22 may be deflected for the purpose of making the chain exert a downward pressure on the eye 29$^a$, so as to depress in a measure the front part of the frame 10 and prevent the draft-tongue from lifting too high.

The machine is especially designed to be drawn by a team of horses; but under some circumstances it may be desirable to employ a single draft-animal. To adapt the machine for service under these conditions, the front ends of the members forming the draft-tongue may be separated to make the tongue members 11 12 serve the purposes of thills, and the tongue members are fastened in their spread position by adjusting-clips 18 on the front rail of the machine-frame and connecting the tongue-clips 19 to the frame-clips by the bolts.

Changes in the form, proportion, size, and the minor details of construction within the scope of the appended claims may be resorted to without departing from the spirit or sacrificing any of the advantages of this invention.

What I claim is—

1. In a machine of the class described, the combination with the main frame, of wheel-hangers adjustably connected with said frame, and movable in planes parallel to the line of draft, and oscillatory axle-carrying spindles mounted in said wheel-hangers and supporting carrying-wheels, substantially as set forth.

2. The combination with a main frame, of wheel-hangers supported thereon and adjustable in planes parallel to the line of draft, vertical spindles mounted in said hangers and supporting the carrying-wheels, and adjusting devices connected with said spindles for changing the relation of the wheels to the line of draft, whereby the wheels may be adjusted fore and aft on the frame parallel to the line of draft thereon, and said wheels are also adjustable to positions obliquely to the line of draft, substantially as described.

3. The combination with a carrying-frame, of horizontal bars or rods supported in fixed positions thereon, wheel-hangers adjustable on said bars or rods and having means for firm attachment to said frame, wheel-spindles supported in the hangers for adjustment on vertical axes independently of the adjustment of said hangers on the rods or bars, carrying-wheels mounted on said spindles, and an adjusting appliance connected with the spindles for rocking the latter simultaneously in their bearings on the hangers, substantially as described.

4. The combination with a carrying-frame, of horizontal rods or bars supported in fixed positions on said frame, wheel-hangers provided with the face-plates and the horizontal sleeves which are fitted respectively to the frame and the horizontal rods or bars, means for fastening the face-plates firmly to the frame, vertical spindles mounted in sleeve-bearings of said hangers and supporting the carrying-wheels, a slide having link connections with said vertical spindles, and means for moving said slide in either direction, substantially as described.

5. In a machine of the class described, the combination with a frame, of a two-part tongue having rearwardly-divergent members pivoted individually to the rear part of the frame, a pair of angular clip-plates fastened to the frame at the front side thereof, and arranged respectively above and below the tongue members, means for clamping the said clip-plates upon the tongue members to hold them at the desired separation, and a doubletree interposed between the tongue members and the lower one of the clip-plates, substantially as set forth.

6. The combination with a frame, of draft-eyes, secured thereto, a tongue, a doubletree supported by the tongue and also having the draft-eyes at its ends, guide-eyes supported by the frame below the draft-eyes thereon, and in advance of the latter, and whiffletree-chains connected to the draft-eyes of the doubletree and the frame, said chains adapted to be passed through the guide-eyes, substantially as described.

7. In a machine of the class described, the combination with the main frame, of a gang-frame having a swiveled and pivotal connection with the main frame, raising and lowering mechanism for vertically adjusting the gang-frame, and a separate adjusting device carrying the raising and lowering mechanism, and having means for swinging the latter in a horizontal plane to provide for the horizontal adjustment of the gang-frame, substantially as specified.

8. The combination with a main frame, of gang-frames adapted to carry teeth and each having jointed connection with said main frame, a rock-shaft mounted for endwise adjustment and having linked connections with one gang-frame, and means for rocking said shaft to adjust the gang-frame vertically, substantially as described.

9. The combination of a main frame, and adjustable gang-frames, of a carrier, a swivel-bearing, a rock-shaft mounted in said carrier and the swivel-bearing to be capable of endwise and rocking movement therein, connections between the rock-shaft and a gang-frame, and means for rocking said shaft, substantially as described.

10. The combination with a main frame, and a gang-frame, of a shiftable carrier supported by said main frame for movement in the path obliquely to the line of draft, a swiveled bearing, a rock-shaft mounted in said bearing and the carrier to partake of the shiftable movement of the latter, and link connections between the shaft and the gang-frame, substantially as described.

11. The combination with a main frame, and independent gang-frames jointed to said main frame, of separately-adjustable carriers supported by said main frame, a locking device adapted to confine both carriers in their normal positions and in fixed relation to said main frame, and adjusting devices supported in part by said carriers and connected with the gang-frames, substantially as described.

12. The combination with a main frame, of a plate or platform having the oblique slots, carriers adjustably connected to the slotted plate or platform and provided with cam-faces, a cam-formed locking-block mounted on said platform or plate and arranged to engage with both of the carriers when in their normal positions, gang-frames jointed to the main frame, rock-shafts supported in part by said carriers and by the main frame, and connections between the rock-shafts and the gang-frames, substantially as described.

13. A gang-frame consisting of an angular beam, a series of side bars disposed in the plane of a part of said beam, a through-rod connecting the beam and the said side bars, spacing devices mounted on said rod, and a slotted bar fastened individually to the bars of said frame, substantially as described.

14. A gang-frame consisting of a beam, a plurality of shovel-carrying bars arranged in substantial parallelism and connected at one end with the beam, and a transverse coupling common to all of the bars and having individual adjustable connections therewith.

In testimony that I claim the foregoing as my own I have hereto affix my signature in the presence of two witnesses.

JOHN HARTZELL ZINN.

Witnesses:
D. JEROME SWARTZ,
WILLIAM S. SHIELDS.